Nov. 22, 1966  J. P. LOMBARDI  3,286,336
METHOD OF MAKING NESTABLE PIPE
Filed March 10, 1965

INVENTOR.
JACK P. LOMBARDI
BY Bruns and Jenney
attys

United States Patent Office 3,286,336
Patented Nov. 22, 1966

3,286,336
METHOD OF MAKING NESTABLE PIPE
Jack P. Lombardi, Duguid Road, Manlius, N.Y.
Filed Mar. 10, 1965, Ser. No. 438,595
4 Claims. (Cl. 29—411)

This invention relates to a method for making nestable pipe of the large culvert or piling type.

Nestable pipe heretofore has been made in short sections by stamping the sections from sheet metal so that the sections can be shipped at comparatively low cost and assembled at the site. Recently, the demand for metal pipe, particularly corrugated pipe, in the larger diameters which take up a disproportionate amount of space when shipped finished, has created a demand for heavy duty nestable pipe which can be shipped nested and assembled at the site.

The primary object of the present invention, accordingly, is to provide a heavy duty nestable pipe.

Another important object is to provide a practical method of manufacturing nestable pipe which may be assembled to provide a heavy duty pipe but which may be nested compactly for shipment.

Other objects and advantages will become apparent from the following description in conjunction with the accompanying drawing, in which.

Figure 1:
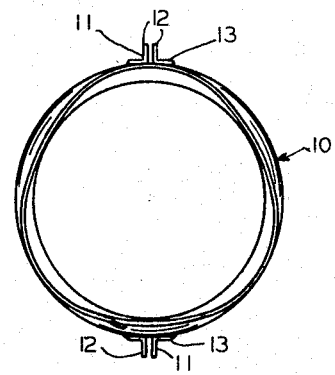
FIGURE 1 is an end elevational view of a length of pipe with fastening flanges attached according to the invention.
Figure 2:
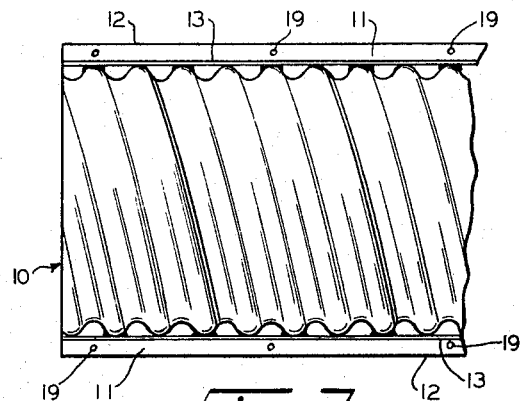
FIGURE 2 is a fragmentary side elevational view thereof.

Referring first to FIGURES 1 and 2, a length of corrugated pipe 10 is shown with four angle irons 11 attached as shown. It will be understood that the pipe 10 may be of any desired length and any desired diameter, of the order of 6″ diameter or larger, the larger the pipe the more space being saved by nesting. The pipe shown is of the type manufactured according to the invention disclosed in my co-pending application Ser. No. 351,352 filed March 12, 1964, but may be of any other kind of pipe of large diameter.

The angle irons 11 extend longitudinally of the pipe 10 and are located in pairs at two diametrically opposite sides of the pipe. Each angle iron 11 has a flange 12 projecting substantially radially of the pipe and another flange 13 disposed in a plane substantially tangent to the outer circumference of the pipe. The projecting flanges 12 of each pair of angle irons are spaced apart as shown and the flanges 13 project in opposite directions away from the pair of spaced flanges 12. Flanges 13 are welded as shown or otherwise secured to the pipe 10. Since the pipe 10 is corrugated the weld is of necessity to the ridges or high spots of the corrugations and the welds may be at any suitably spaced intervals.

It will be understood that the angles 11 may be temporarily clamped to the pipe 10 while being welded thereto or may be held in position in any conventional manner. Preferably, spacers of the proper thickness, as hereinafter will appear, are placed between the flanges 12 during the welding operation so that the flanges will be aligned in parallel and diverge outwardly slightly.

Figure 3:
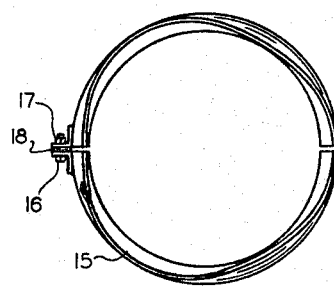
FIGURE 3 is an end elevational view of two sections of nestable pipe bolted together.
Figure 4:
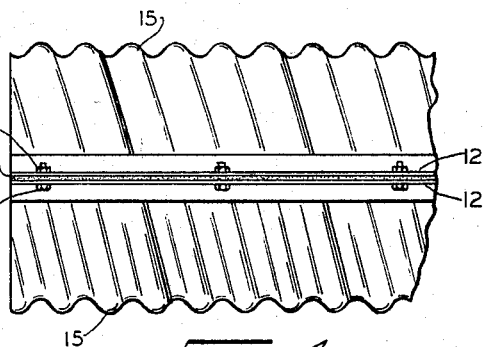
FIGURE 4 is a fragmentary side elevational view thereof.
Figure 5:
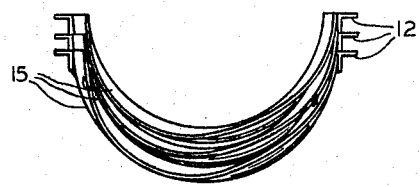
FIGURE 5 is an end elevational view of several pipe sections nested.

After the angle irons 11 are secured to the pipe 10 the pipe is sawed in half longitudinally between each pair of projecting flanges 12 to form two nestable sections 15, 15 having flanges 12 by means of which they can thereafter be bolted together, as shown in FIGURES 3 and 4, by bolts 16 and nuts 17. A gasket strip 18 may be placed between the flanges 12 when they are bolted together, as shown, or the strip may be omitted.

It will be understood that the saw blade used to cut the pipe 10 into sections 15 has a thickness substantially equal to the cut or kerf made by the saw. This kerf can be precisely determined and the distance that the flanges 12 are spaced apart when the angle irons 11 are secured to pipe 10 is substantially the thickness of the saw blade to be used and no less than the width of the kerf.

Preferably, the flanges 12 of the angle irons are provided with a plurality of aligned holes 19 for the bolts 16 before the angle irons 11 are secured to the pipe 10. However, the holes 19 may be drilled after the sections 15 are cut apart. The holes 19 are uniformly spaced in conventional manner, so that the sections 15 may be bolted together whether one section is reversed end-to-end or not.

It will be understood that the above-described method of manufacturing nestable pipe is peculiarly adapted for making sections having a comparatively long length but should it be desired to make sections to be secured together to make a pipe longer than the sections, conventional means may be employed. Should it be desired to bolt together several sections of pipe employing a collar, the sections 15 are provided having suitable plain ends along which the angle irons 11 do not extend. Should it be desired to bolt the opposite sections together in staggered relation to form a long pipe line, half length sections for the ends can be easily provided to do this in the usual manner.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. A method of manufacturing nestable pipe sections from finished pipe, comprising: as a first step, securing a pair of angle irons longitudinally of the pipe on each of two diametrically opposite sides of the pipe, one flange of each angle iron of each pair projecting substantially radially from the pipe and the projecting flanges of each pair being spaced apart a small distance; and then, as a second step, sawing the pipe apart longitudinally between each pair of projecting flanges; the projecting flanges of each pair of angle irons being spaced apart in the first step a distance substantially equal to the thickness of the kerf made by the saw to be used in the second step.

2. A method of manufacturing nestable corrugated pipe sections, comprising: as a first step, securing to a length of corrugated finished pipe a spaced pair of angle irons on each of two diametrically opposite sides of the pipe, one flange of each angle iron of each pair of projecting substantially radially from the pipe and being disposed longitudinally of the pipe parallel to the projecting flange of the other angle iron of the pair; and then, as a second step, sawing the pipe apart longitudinally between each pair of projecting flanges; the projecting flanges of each pair in the first step being spaced apart a distance substantially equal to the thickness of the kerf made by the saw to be used in the second step.

3. The method of manufacturing nestable corrugated pipe sections defined in claim 2 characterized by providing each of the projecting flanges with a plurality of longitudinally aligned and equally spaced bolt holes whereby two sections may be bolted together to form a pipe.

4. A method of manufacturing nesting corrugated pipe sections from finished corrugated pipe, comprising: first, temporarily securing to a length of corrugated pipe a spaced pair of angle irons on each of two diametrically opposite sides of the pipe, one flange of each angle iron of each pair projecting substantially radially from the pipe and being disposed longitudinally of the pipe parallel to the projecting flange of the other angle iron of the pair, the other flange of the angle irons of each pair extending in opposite directions away from the spaced projecting flanges in planes substantially tangent to the pipe; then permanently securing said other flanges at spaced intervals therealong to high points along the pipe; and thereafter sawing the pipe longitudinally into halves between each pair of projecting flanges; the projecting flanges of each pair being spaced apart prior to sawing a distance substantially equal to the thickness of the kerf made by the sawing, and the projecting flanges being provided with bolt holes whereby the halves may thereafter be bolted together.

References Cited by the Examiner

UNITED STATES PATENTS

| | | | |
|---|---|---|---|
| 900,039 | 9/1908 | Schafly | 138—159 |
| 987,693 | 3/1911 | Von Borries | 318—159 |
| 1,316,272 | 9/1919 | Clark et al. | 29—411 |
| 1,350,830 | 8/1920 | Murray et al. | 29—411 |
| 2,693,021 | 11/1954 | Sinclair et al. | 29—481 X |
| 2,787,051 | 4/1957 | Risley | 29—401 |
| 3,046,647 | 7/1962 | Carstens | 29—463 X |

JOHN F. CAMPBELL, *Primary Examiner.*

THOMAS H. EAGER, *Examiner.*